US012546886B2

(12) United States Patent
Chakravarty et al.

(10) Patent No.: US 12,546,886 B2
(45) Date of Patent: Feb. 10, 2026

(54) APPARATUS AND METHOD FOR ENVELOPE DETECTION

(71) Applicant: Position Imaging, Inc., Portsmouth, NH (US)

(72) Inventors: Narasimhachary Nallana Chakravarty, Rollinsford, NH (US); Rafal Piotrowski, Portsmouth, NH (US)

(73) Assignee: Position Imaging, Inc., Portsmouth, NH (US)

( * ) Notice: Subject to any disclaimer, the term of this patent is extended or adjusted under 35 U.S.C. 154(b) by 0 days.

(21) Appl. No.: 18/484,676

(22) Filed: Oct. 11, 2023

(65) Prior Publication Data

US 2024/0119404 A1  Apr. 11, 2024

Related U.S. Application Data (60) Provisional application No. 63/414,940, filed on Oct. 11, 2022.

(51) Int. Cl.
G07C 9/28 (2020.01)
G01S 13/89 (2006.01)
G06Q 10/0836 (2023.01)
G07C 9/22 (2020.01)
G06Q 10/0833 (2023.01)

(52) U.S. Cl.
CPC .......... *G01S 13/89* (2013.01); *G06Q 10/0836* (2013.01); *G07C 9/22* (2020.01); *G07C 9/28* (2020.01); *G06Q 10/0833* (2013.01)

(58) Field of Classification Search
CPC .......... B07C 3/00; B07C 3/008; B07C 7/005; B07C 7/02; B07C 7/04
USPC .......................................................... 209/584
See application file for complete search history.

(56) References Cited

U.S. PATENT DOCUMENTS

| | | | | |
|---|---|---|---|---|
| 5,881,890 | A | * | 3/1999 | Wiley ....................... B07C 7/04 209/703 |
| 8,843,231 | B2 | * | 9/2014 | Ragusa ................... B07C 7/005 700/226 |
| 11,416,805 | B1 | | 8/2022 | Piotrowski et al. |
| 11,436,553 | B2 | | 9/2022 | Kirmani et al. |
| 11,436,557 | B1 | * | 9/2022 | Kumar ................. G01G 19/387 |
| 2017/0293885 | A1 | * | 10/2017 | Grady ................ G06K 7/10009 |

(Continued)

*Primary Examiner* — Michael McCullough
*Assistant Examiner* — Jessica L Burkman
(74) *Attorney, Agent, or Firm* — Schmeiser, Olsen & Watts LLP (57) ABSTRACT

A package management system comprises a slot including a pair of opposing spaced-apart planar surfaces on a base, and having a transmitter that generates an electromagnetic signal and a receiver in a path of the electromagnetic signal emitted by the transmitter. The system generates a signal indicative of whether the receiver senses the electromagnetic signal emitted by the transmitter. A control unit is in communication with the receiver and determine from the signal produced by each receiver of the given slot whether that receiver senses the electromagnetic signal. The processor considers the given slot to be empty if the signal produced by the receiver of indicates that the receiver senses the electromagnetic signal and considers the item to be present in the given slot if the signal produced by the receiver of the given slot indicates that a strength of the electromagnetic signal is below a predetermined threshold.

19 Claims, 7 Drawing Sheets

(56) References Cited

U.S. PATENT DOCUMENTS

2018/0197139 A1     7/2018   Hill
2021/0303852 A1     9/2021   Hill et al.
2022/0383318 A1*   12/2022   Edgren ................ G06Q 20/308

* cited by examiner

APPARATUS AND METHOD FOR ENVELOPE DETECTION

CROSS REFERENCE TO RELATED APPLICATIONS

This application claims priority to a provisional application entitled "Beam-Break Detection of Envelopes" and having provisional application No. 63/414,940, filed Oct. 11, 2022, which is hereby incorporated by reference in its entirety.

FIELD OF INTEREST

The present inventive concepts relate to package tracking and management systems and methods.

BACKGROUND

Because of their small and thin form factor, envelopes and similarly sized and shaped (i.e., flat) packages can escape notice in package management systems that rely primarily on computer vision techniques to detect and track items. Desired is an improvement of such package management systems.

SUMMARY

In one aspect, a package management system for tracking a location of an item comprises one or more slots, each slot including a pair of opposing spaced-apart planar surfaces slidably or fixedly mounted on a base, the pair of planar surfaces having one or more transmitters each configured to generate and output an electromagnetic signal and one or more receivers, each receiver disposed in a path of the electromagnetic signal emitted by one of the one or more transmitters and each producing a signal indicative of whether that receiver senses the electromagnetic signal emitted by that one of the one or more transmitters, wherein the opposing spaced-apart planar surfaces are part of any mechanical setup used for storage of items; a control unit including at least one processor in communication with the one or more receivers of each slot, the at least one processor being configured to determine from the signal produced by each receiver of a given slot whether that receiver senses the electromagnetic signal, the at least one processor being configured to consider the given slot to be empty if the signal produced by each receiver of the given slot indicates that each such receiver senses the electromagnetic signal and to consider the item to be present in the given slot if the signal produced by each receiver of the given slot indicates that a strength of the electromagnetic signal is below a predetermined threshold by at least one of the one or more receivers; and a data-acquisition device configured to acquire information associated with an item to be placed in or removed from the one or more slots, and the at least one processor is in communication with the data-acquisition device to receive the acquired information associated with the item.

In another aspect, a method for tracking a location of an envelope comprises generating a source of electromagnetic energy from an emitter disposed in a first wall of a slot designated for receiving envelope-like items; aligning a sensor disposed in a second wall of the slot with the electromagnetic energy from the emitter disposed in the first wall; producing, by the sensor, a signal indicative of whether the sensor senses the electromagnetic energy; considering the slot to be empty if the electromagnetic energy indicates the sensor senses the strength of the electromagnetic energy; and registering the envelope as being located in the slot if the signal indicates the strength of the electromagnetic signal is below a predetermined threshold by the sensor.

BRIEF DESCRIPTION OF THE DRAWINGS

The described advantages of this invention may be better understood when referring to the following descriptions in conjunction with the accompanying drawings. Like numerals within these drawings indicate like elements and features in various figures. For clarity, not every element or feature may be labeled in every figure. The drawings are not to scale and are meant to illustrate the principles of the invention.

DETAILED DESCRIPTION

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Moreover, features illustrated or described for one embodiment or example may be combined with features for one or more other embodiments or examples. Those of ordinary skill having access to the teaching herein will recognize additional implementations, modifications, and embodiments, as well as other fields of use, which are within the scope of the present disclosure as described herein.

Package management systems embodying the present invention generally operate as follows. A carrier approaches a package room carrying any number of packages, envelopes, and flat packages with the intention of registering each item and depositing them in designated holding areas within the room. A data-acquisition device just outside of (or in the room) acquires information for each item being dropped off. The device can be a scanner that reads a label or a code affixed to the package or envelope, a biometric reader or keypad by which the carrier submits information that permits access to the room, or a computer display with which the carrier interacts using his or her own electronic mobile device. Such a device is generally referred to as a data-acquisition device. Key information acquired about each item includes, among other information, its intended recipient. The package management system uses this information to register an item.

After submitting the information to the system, the carrier then places the item somewhere in the holding area. Shelves serve well for receiving typical packages. The package management system can use computer vision and/or weight sensors to know a location in the holding area for each package placed on shelves. Examples of such package management systems are described in U.S. Pat. No. 11,436,553, titled, "System and Method of Object Tracking Using Weight Confirmation", issued Sep. 6, 2022, in U.S. Pat. No. 11,416,805, titled, "Light-based Guidance For Package Tracking Systems", issued Aug. 16, 2022, and in U.S. Pat. Appln. Pub. No. US-2018-0197139-A1, appln. Ser. No. 15/861,414, filed Jan. 3, 2018, titled, "Package Delivery-sharing System and Methods", the entireties of which patents and patent application are incorporated by reference herein.

For envelopes and the like, the package management system uses bins, slots, dividers, or compartments configured with beam-break technology to register and track the location of envelopes. In brief overview, each envelope (or flat package) slot produces an uninterrupted beam of light when it is empty, and when the slot holds an item, the item breaks that beam. The system keeps track of which slots are empty and which slots hold registered items. The description of these package management systems follows below.

After the packages and envelopes are at their holding areas, the intended recipient may be notified. (Alternatively, without the benefit of any notification, people can come periodically to "check their mail.") An intended recipient should have authorization to access the package or envelope in the room. The authorization can be linked to the identity of the recipient, for example, because he or she resides in the building or complex housing the package room. Authorization can take the form of a passcode sent to the recipient by virtue of a notification (electronic, telephonic). Anyone with this passcode can access the room to acquire the package or envelope (the target recipient can share the code with another for purposes of getting the package).

When an authorized person comes to pick up a package, the person provides to the data-acquisition device credentials for entering the room. Based on this information, the package management system knows which envelope or package the person has come to claim and in which slot the item is located (since it was previously registered at that location when the carrier dropped it off). To help the person find the item, the package management system may use light, sound, or combination thereof to lead to the presently registered location of the target item.

After the person takes the item, the package management system detects its removal. In the case of envelopes, removal is signified by the resumed detection of the light beam (its beam is no longer broken). If the wrong item is removed, for instance, resumed detection of the light beam occurs in a different slot from the one in which the envelope is registered, the package management system can catch this improper activity and take remedial action, examples of which include alerting the person taking the item by sounding an alarm, flashing light, or sending them or another person an electronic notification.

Figure 1:
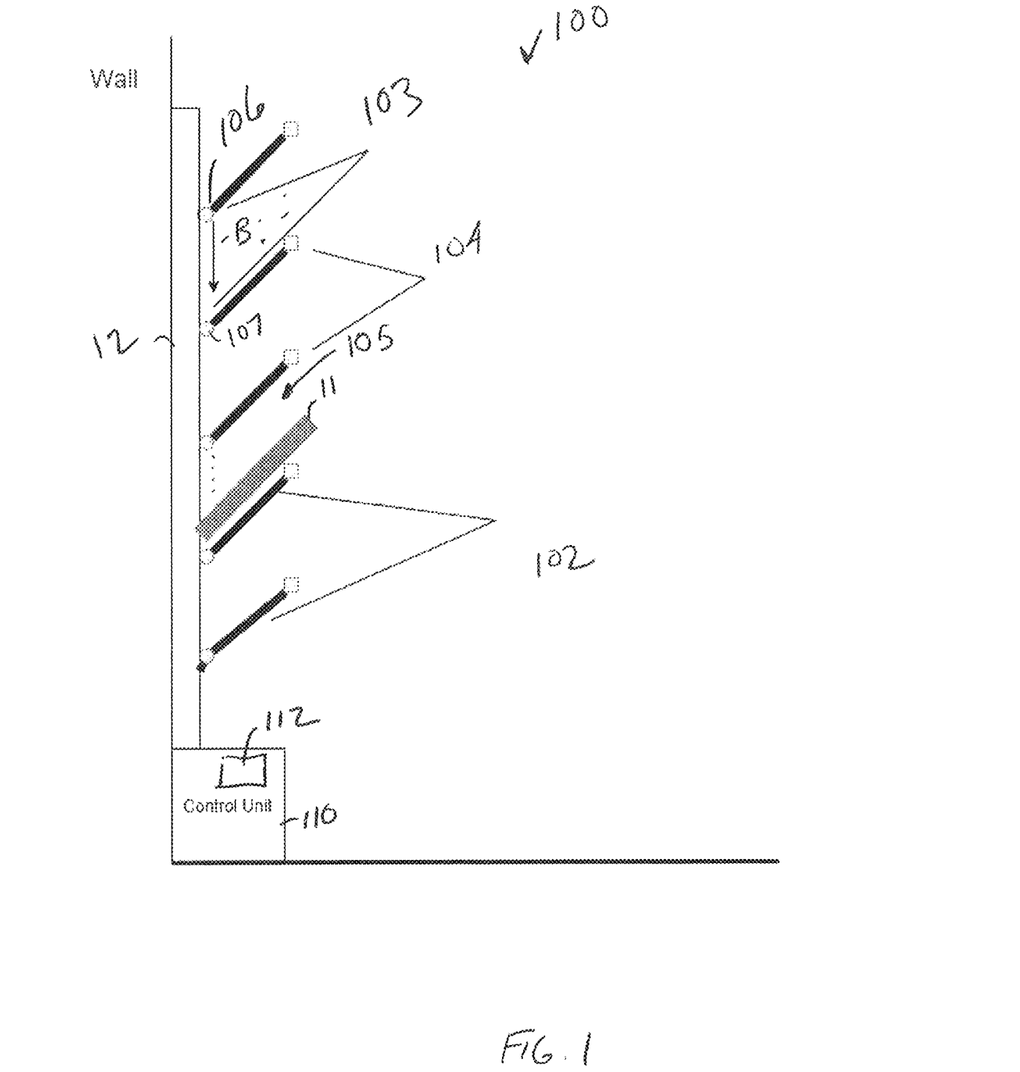
FIG. 1 shows an embodiment of a package management system with wall-mounted envelope organizer comprising a plurality of sloped dividers.

FIG. 1 shows an embodiment of a package management system 100 with a wall-mounted envelope organizer comprising a plurality of sloped dividers 102. Each pair of adjacent dividers 102 forms a slot 105 for items 11 such as envelopes or thin and flat packages. The rising slope of the dividers relative to the wall 12 keeps any item 11 placed atop them from falling out. Gravity urges the item to slide down to the bottom of the slot 105. The back of the organizer determines the farthest extent of the item's descent into the slot 105. Near this farthest extent, the organizer includes a light source 104 such as an LED or the like that produces a continuous light beam between neighboring pairs of dividers 102. Each opposing pair of dividers has a beam transmitter 106 on one divider and a beam receiver 107 on the other divider. In the embodiment shown in FIG. 1, the transmitter 106 and receiver 107 are directly across from and aligned with each other (i.e., the lines of sight of the transmitter and receiver are coincident).

To accommodate items that are of a narrow or small size that may not break a single beam (B) between a transmitter/receiver pair (as in FIG. 1), the opposing pair of dividers 102 can be configured to produce multiple beams or beam segments that traverse the space between them. One embodiment, shown in FIG. 5, uses mirrors 502, 503 on the interior surfaces of the two dividers 102A, 102B (generally, 102) to cause the beam (B) to bounce back and forth between them on its way from the transmitter 106 to the receiver 107, producing multiple beam segments of the single beam that may be broken, any one of which is sufficient to trigger (i.e., signal) a beam break. In another embodiment, shown in FIG. 6, the two dividers 102A, 102B have multiple transmitter-receiver pairs 106, 107, i.e., beam break sensors 103 disposed at various points along a length of the dividers. Each pair produces a separate beam B that traverses the gap between the two dividers 102A, 102B.

During a typical operation, the beam transmitter 106 emits a light beam (B) (e.g., infrared, visible light). In some embodiments, the transmitter 106 and receiver 107 exchange electromagnetic signals in other spectrums (different than a light spectrum), for example, at RF frequencies. The beam (B) passes through the empty space, or slot formed, between the dividers 102A, 102B. The coincident beam receiver receives the light beam (B) and produces a first signal in response to sensing the light. The first signal signifies the empty space between the dividers remains empty. When the beam receiver does not receive the light beam, the receiver produces a second signal indicating the receiver senses no light. The second signal signifies an item disposed in the space between the dividers 102A, 102B has blocked the beam (B) from reaching the receiver 107. This is referred to as a beam-break or beam interruption. In some embodiments, the beam (B) is not an optical beam but is instead in the RF domain where the receiver 107 is an RF receiver that measures a signal strength to determine whether an item is along the signal path between RF transmitter and receiver. As described herein, embodiments include the receipt by a sensor of an electromagnetic signal, e.g., light, RF, and so on, having a particular strength. The signal strength can be compared to a predetermined threshold. For example, a light signal may have a signal strength of 0, which can be below a threshold, which can be used to determine by the system whether an object is along the signal path indicative of the presence of an object.

In communication with the various transmitters and receivers, wired or wirelessly, is a control unit 110 comprising at least one processor 112, which perform the various operations described herein. The control unit 110 may include other computer-related components such as a memory, input/output devices, a bus, and so on (not shown). From the signals provided by the receivers, the control unit 110 is configured to know which slots 105 are empty and which slots 105 hold items 11 such as envelopes or packages. In addition, the control unit 110 maintains information about the envelope or package, for example, the identity of the intended recipient, a code to get it from the room, its location within an area designated for holding envelopes. The control unit 110 registers the location with the package management system when the item is dropped into the slot 105 (by beam break). Information about the envelope can be acquired before or when the envelope is placed in its slot 105 by a carrier.

In addition, each divider 102 can have a light source 104, for example, an LED. The LED can be at the end of the divider 102 where it is prominently in view, for example, shown in FIG. 1. The control unit 110 can illuminate the light source 104 when an item is in the slot 105 defined by two dividers 102 and the intended recipient is coming to retrieve it. Either of the LEDs 104 (two dividers 102 form a slot 105) can be lit, depending on the arrangement of the dividers 102 and considerations for which LED 104 would suggest to a user that an item is present in the slot 105. The role of the LED 104 is to guide a user to the slot 105 with the envelope. Alternatively, or in combination with light guidance, the control unit 110 can use sound or audible instructions, in embodiments, where the system 100 includes audio-generating elements such as speakers, to lead a person coming to retrieve their item to the registered item location. By beam restoration, the control unit 110 knows when the item 11 is removed from the correct slot 105, or if the wrong item is removed from the wrong slot. The control unit 110 can record and store timestamps associated with the placement and removal transactions regarding a given item 11, including any video captured by any camera(s) (not shown) in the holding area.

The package management system 110 typically has more than one slot 105. For example, a system with five dividers 102 has four slots 105. Each of the interior dividers 102 (i.e., a divider that faces two other dividers and is shared by two slots) has both a light-beam transmitter 106 and a light-beam receiver 107, i.e., they can be part of a single transceiver. The transmitter 106 is configured to produce a light-beam in one of the two slots 105, while the receiver 107 is configured to receive a light beam in the other of the two slots 106. Those dividers not shared by two slots can also have transceivers, but the unused functionality (i.e., transmitter or receiver) is turned off (under control unit control).

In one embodiment, the transmitter 106 and receiver 107 are infrared (IR) break beam sensors 103 (with 5 mm LEDs) and the at least one processor includes a Raspberry Pi microcontroller.

Figure 2:
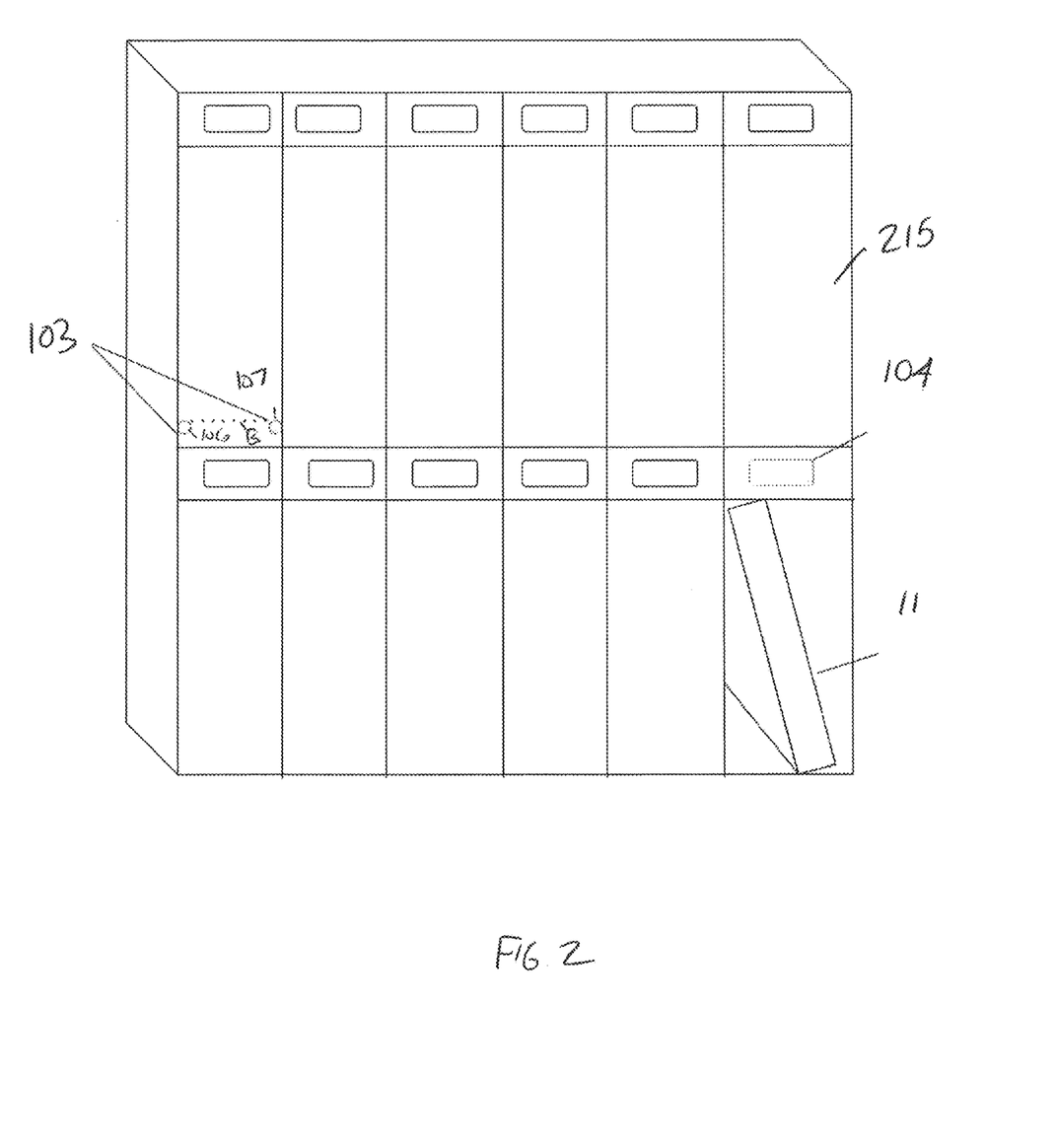
FIG. 2 shows an embodiment of a bank of storage lockers or slots employed in a package management system.

FIG. 2 shows an embodiment of a bank of storage lockers or slots 215 employed in a package management system, each locker 215 configured with beam-break technology used to detect when an object 11, such as an envelope, is deposited within the locker 215. The lockers 215 can be open-faced or have front doors (e.g., secured or unsecured). Each locker 215 is configured with a beam transmitter 106 on one side of the locker 215 aligned with a beam receiver 107 on the opposite side of the locker 215. The transmitter-receiver alignment occurs in the lower half of the locker 215, preferably near the bottom, thereby ensuring any item, even short ones, will break the beam (B) when placed inside. For envelopes and flat packages, the lockers are narrow to ensure the items 11 are placed on end (rather than flat on the bottom) and thus are ensured to break the light beam (B). The package management system using such lockers 215 operates like those previously described.

Above each locker 215 is an LED 104 that can automatically illuminate when an object is within that locker 215. Alternatively, the LED 104 does not automatically light, and a control unit (not shown) of the system can illuminate the LED 104 when someone has come specifically to pick up the contents of the locker 215 (i.e., to guide the person to the locker holding their item). Further, the LED 104 may include a plurality of lights of different colors (e.g., red and green) and the control unit turns on the green LED 104 when the recipient is being guided to the locker 215 and turns the LEDs 104 of every other locker red to indicate the wrong locker. Other techniques, such as blinking the LED 104, can be used to guide to the correct locker 215.

Figure 3:
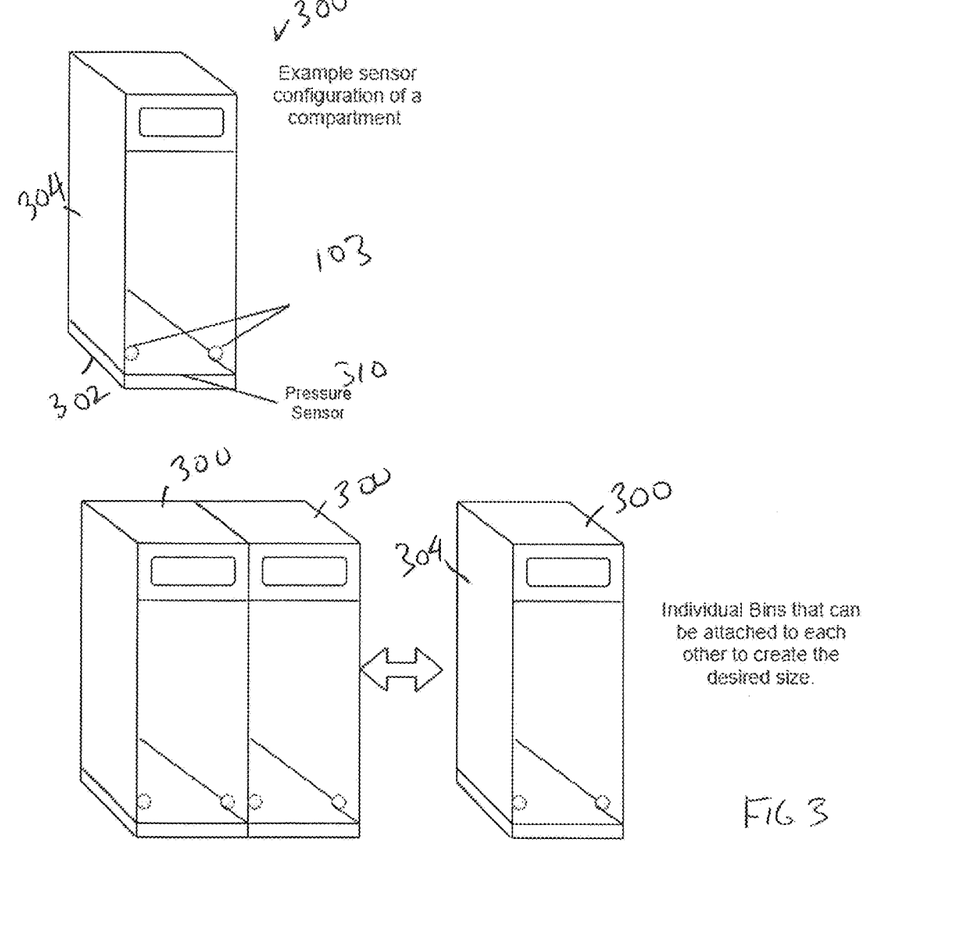
FIG. 3 shows an embodiment of a compartment (bin or slot) that can be employed in a package management system.

FIG. 3 shows an embodiment of a compartment 300 (bin or slot) that can be employed in a package management system. The compartment 300 includes a base 302, spaced-apart opposing sidewalls 304, and a back wall (not shown) that is perpendicular to the base 302 and sidewalls 304. The pair of sidewalls 304 has a pair of sensors 103, one sensor 103 in each sidewall 304, and the pair of sensors 103 are aligned to each other (i.e., the lines of sight of the sensors are coincident). One sensor 103 operates as the transmitter of light, e.g. same as or similar to transmitter 106 of FIGS. 1 and 2, the other as the receiver of the transmitted light, e.g., same as or similar to transmitter 106 of FIGS. 1 and 2. The transmitter and receiver are the terminals of a light path taken by the light beam across the compartment 300. The base 302 of the compartment can have a pressure sensor 310 operably coupled to its surface to provide further physical evidence of an item occupying the compartment 300. The compartment 300 can be modular to facilitate stacking or constructing banks of compartments, like that shown in FIG. 2. Package management systems implementing such compartments operate like those previously described.

Figure 4:
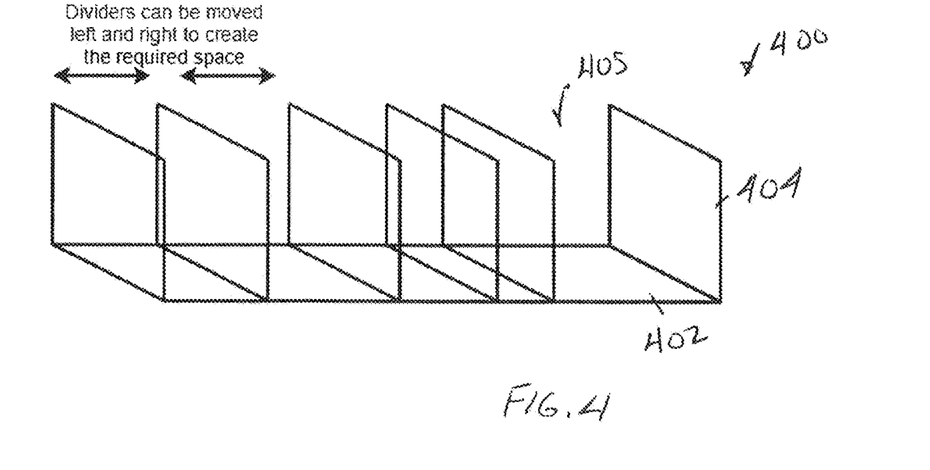
FIG. 4 shows another embodiment of an envelope holder for use in a package management system.

FIG. 4 shows another embodiment of an envelope holder 400 for use in a package management system. This embodiment comprises a base 402 (or platform) with two or more individually movable (e.g., slidable) dividers 404. Each divider 404 movably couples to the base 402 anywhere along the base 402 or at designated (i.e., fixed) positions. For example, the base 402 may include grooves, rollers, or other mechanical elements along a length of the base 402 that engages with a bottom surface of the dividers 404 so that the divider can slide or otherwise move along the length of the base 402. Each divider 404 has a beam transmitter (not shown) facing one side and a beam receiver (not shown) facing the opposite side. The transmitter and/or receiver can be similar to the transmitter 106 and receiver 107 of FIGS. 1-3. A single component that combines the transmit and receive functionality (i.e., a transceiver) can be incorporated into a divider 404, to emit light from one side of the divider 404 and to sense light arriving on the opposite side.

Figure 5:
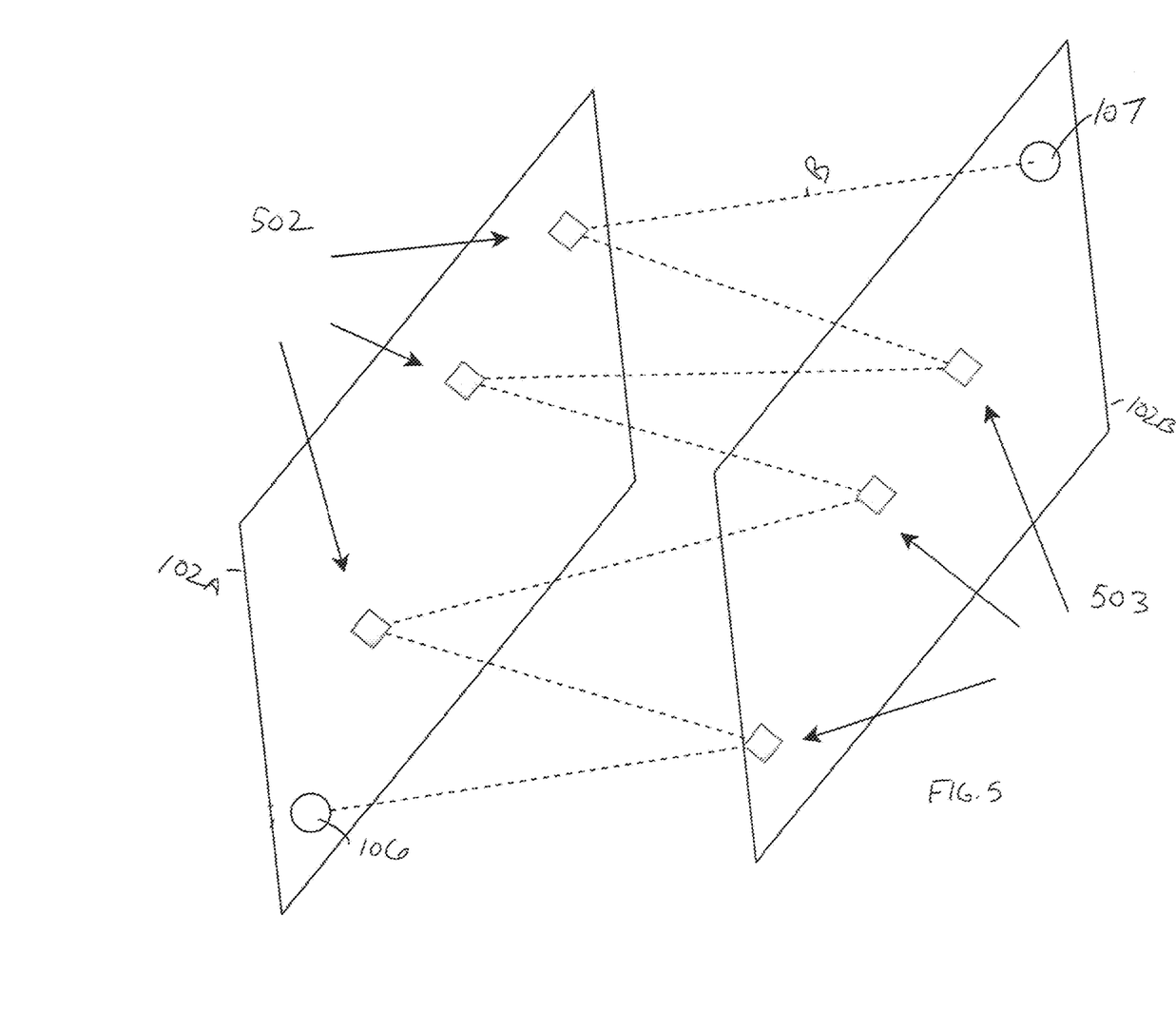
FIG. 5 shows an embodiment of an operation performed by mirrors on interior surfaces of two dividers of a package management system.
Figure 6:
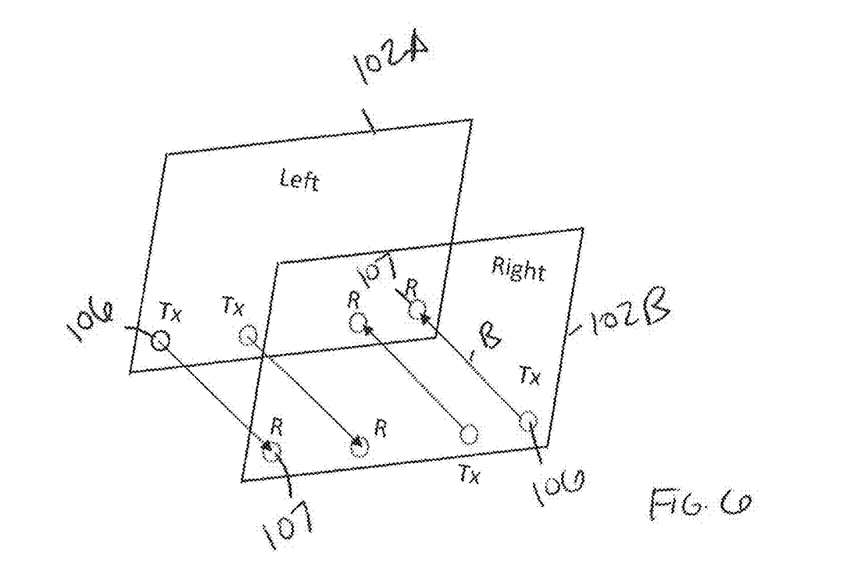
FIG. 6 shows an embodiment of two dividers sharing four beam-break sensors.

Adjacent pairs of dividers 404 produce slots 405 for holding envelopes or packages. The spacing between opposing dividers 404 should at least be narrow enough to prevent the envelope from lying flat on the base. When an envelope is placed into a slot 405, the envelope preferably rests on its edge. The transmitter/receiver (not shown) is disposed on the divider 404 where it is best suited to detect placement of an envelope into a slot 405 (e.g., in the center of the divider, near the edge of the divider 404 that rests on or couples to the base 404. Alternatively, dividers 404 can be configured to produce multiple beams or beam segments, as illustrated in FIGS. 5 and 6. The adjustability of the spacing between dividers 404 accommodates different sizes of envelopes and packages.

FIG. 5 shows left and right planes corresponding to two adjacent opposing dividers 102. The left divider 102A has a transmitter 106 and three mirrors 502, and the right divider 102B has a receiver 107 and three mirrors 503. The placement of the mirrors 502, 503 on the planes is designed to propagate a light beam (B) from the transmitter 106 to the receiver 107 along a length of the dividers 102. The beam is output from the transmitter 106 at an acute angle. A first mirror 502 on the right plane is in the path of the beam and reflects it back to the left plane. A first mirror 502 on the left plane is disposed where it reflects the beam back towards the right plane, where a second mirror 503 is disposed to reflect the beam back to the left plane again. This reflecting of the beam (B) continues until the last mirror 502 on the left plane redirects the beam (B) to the receiver 107 on the right plane. An item that breaks any one of the seven (in this example) beam segments causes a beam break between the transmitter 106 and receiver 107. A similar result can be achieved with as few as one mirror on each of the two planes, which would produce three beam segments. The mirrors can be placed at varying locations in the divider 102, provided the opposing mirrors on the other divider 102 are correspondingly located in the path of the reflected beam.

Figure 7:
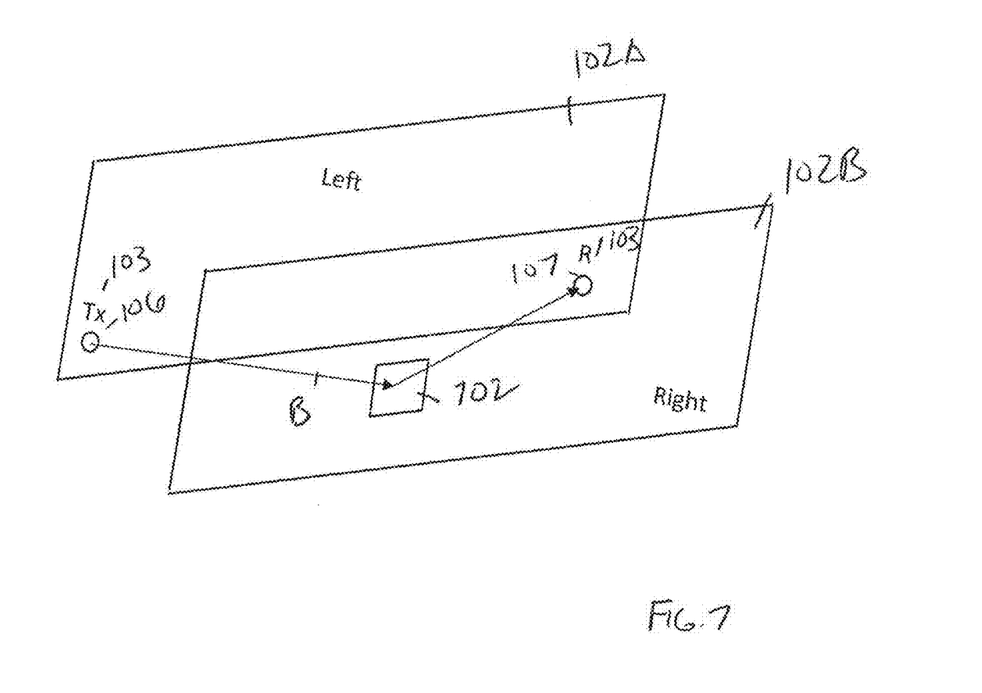
FIG. 7 shows an embodiment of one divider having both a receiver and a transmitter spaced apart for, preferably, a major length of the divider, and another device having a plane having a mirror appropriately positioned to reflect light coming from the transmitter back to the receiver.

In another embodiment, shown in FIG. 7, one of the two dividers 102 has both the receiver 107 and the transmitter 106 spaced apart for, preferably, a major length of the divider 102, and the other plane has a mirror 702 appropriately positioned to reflect light coming from the transmitter back to the receiver 107. This configuration of the dividers 102 produces two traversals of the slot by the light beam (B). Breaking either beam (or both) indicates the slot between the dividers has an item in it.

FIG. 6 shows left and right planes corresponding to two adjacent opposing dividers 102. The two dividers 102 in this embodiment share four beam-break sensors 103, although the idea applies to as few as two beam-break sensors and to as many beam-break sensors as can reasonably fit on a divider. Each beam break sensor comprises a transmitter 106 and receiver 107 pair. The transmitter 106 is fixed to one divider 102A, and the receiver 107 is fixed to the other 102B, facing and aligned with the transmitter 106. Each beam-break sensor (i.e., transmitter-receiver pair) produces a separate beam (B) across the gap between the dividers 102. The control unit (FIG. 1) is configured to know that the four beams correspond to the slot defined by these two dividers 102, and that loss of any one or more of these four beams indicates an item has been placed in that slot. In some embodiments, one of the dividers 102 can be configured with all transmitters, all receivers, or a mix of transmitters and receivers, provided the other divider has the complementary configuration. For example, to produce four separate beams, the left divider 102A can have three transmitters 106 and one receiver 107 that are optically aligned with three receivers 107 and one transmitter 106, respectively, on the right divider 102B.

Figure 8A:
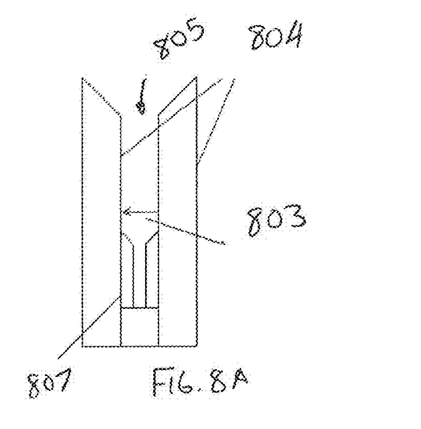
FIGS. 8A-8D show various views of an embodiment of an envelope module comprised of a line (or array) of a plurality of thin individual slots.
Figure 8B:
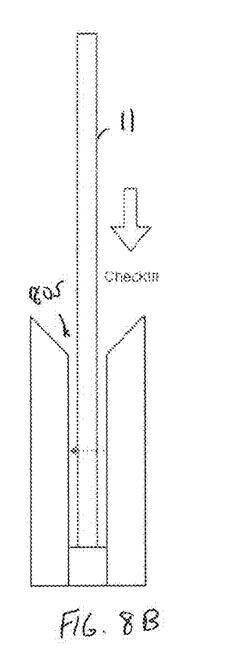
Figure 8C:
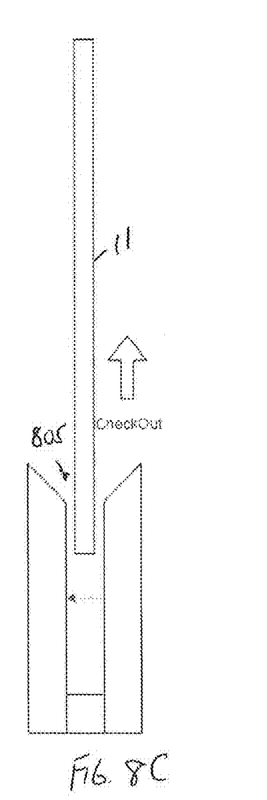

FIGS. 8A-8C show a front view of an embodiment of an envelope module comprised of a line (or array) of a plurality of thin individual slots 805. Each slot 805 focuses on holding a single flat item, such as an envelope. Each slot has a pair of opposing planar surfaces with a small gap therebetween. In general, the gap is sized to closely receive the flat item 11. More than one flat item 11 may be inserted into the slot 805 together, provided they fit and are intended for the same recipient. Optionally, a foam insert 807 abuts the base of each planar surface, and the opposing foam pieces 807 compress according to the thickness of an envelope or other flat item 11 inserted between them. The foam 807 accounts for variability in the thicknesses of the envelopes and helps hold an envelope in place. Each slot 805 is in general long enough (slot length extends perpendicularly into the plane of the drawing) and deep enough (slot depth corresponds to the height of the planar surfaces) to hold a variety of envelope types (e.g., standard, business, manila).

A beam break sensor 803 is disposed above the foam 807 (when foam is present) or at the base of the planar surfaces (when foam is absent). The beam-break sensor 803 or sensor configuration can be configured similar to sensors 103 and/or any of those previously described (e.g., direct line-of-sight, one or more mirrors, multiple sensors). The envelope module can sit on a shelf, for example. Not shown is a controller unit that is in communication with each slot to know when a flat item has been put in (checked in) to the slot, and thus has broken the light beam, and when the flat item is removed (checked out). The controller unit also knows in which slot a given flat item has been placed (because of the item registration process, which includes receiving information about the item when it is being dropped off and recording the slot location of the detected beam break that occurs in connection with dropping off that item).

Each opposing planar surface has an LED 804, which may be used by the controller unit to guide a person who has come to retrieve their flat item, by illuminating both LEDs in response to information provided by the person (e.g., through a kiosk, display, etc.). The envelope module can also have an "attract light" for use in those environments or conditions where the LEDs 804 of an individual slot may not be noticeable enough to draw the person's attention, such as in a well-lit room. In general, the attract light is much larger than the LEDs 804 of the individual slots 805. The attract light is configured to draw the attention of the person from a greater distance than the small slot's LED 804. The attract light draws the person's attention to the general area of the slot-of-interest. Once the person's attention is captured, the illuminated LEDs 804 of the slot 805 can focus the attention and lead to the item-of-interest.

Figure 8D:
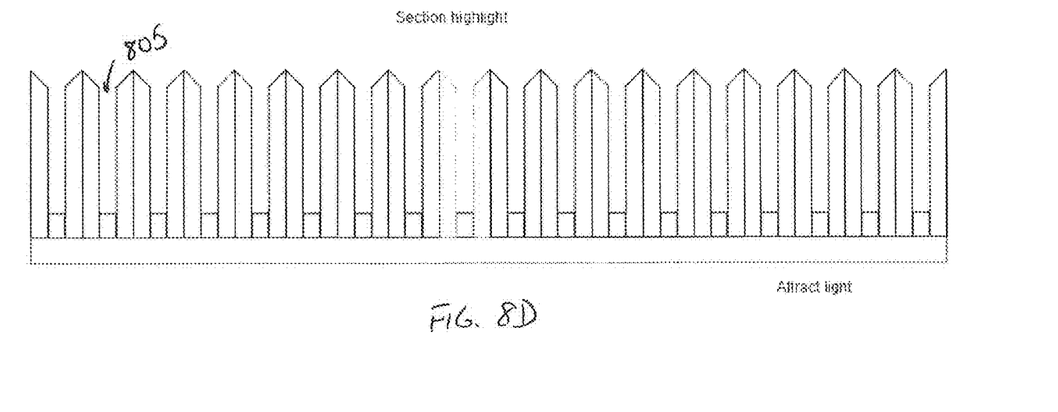
Figure 9A:
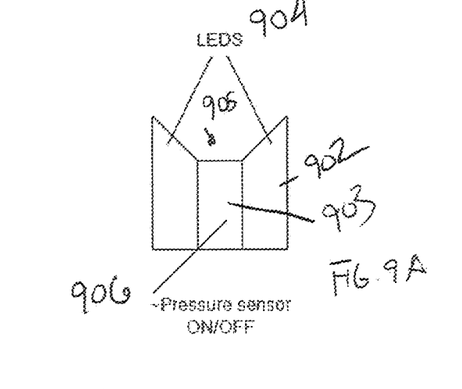
FIGS. 9A-9D show various views of an embodiment of a dry-cleaning module configured to operate in accordance with the aforementioned principles.
Figure 9B:
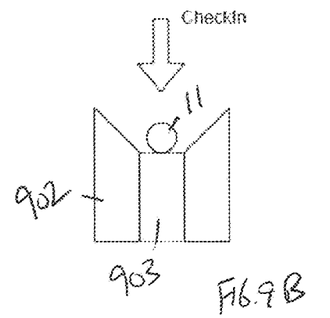
Figure 9C:
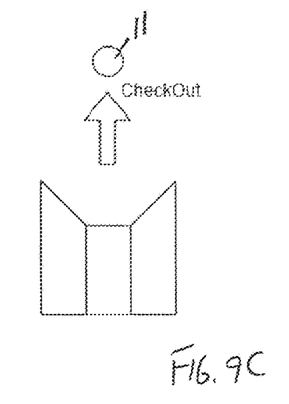
Figure 9D:
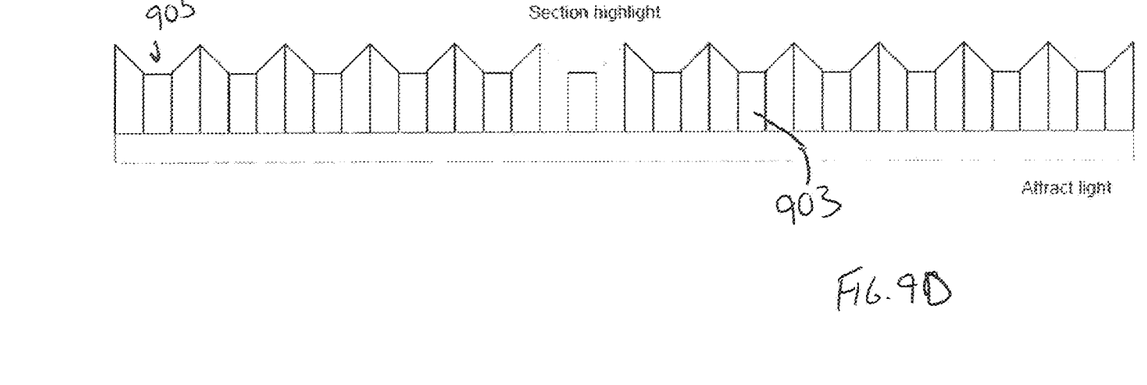

For example, as shown in FIG. 8D, in one embodiment of the envelope module, all the individual slots 805 rest upon a base configured with the attract light. Consider, for example, a room configured with multiple shelves, with each shelf having an envelope module. A controller unit (not shown) is in communication with all the envelope modules and each slot 805 of each module. When a person arrived to retrieve an envelope, the controller unit illuminates the attract light of the shelf-of-interest to draw the person's attention to the specific shelf and illuminates the slot LEDs 804 to focus the attention to the specific slot 805.

FIG. 9 shows an embodiment of a dry-cleaning module configured to operate in accordance with the aforementioned principles. The dry-cleaning module includes a plurality of small individual slots 905 arranged in a row (side-by-side). The slots 905 are part of an apparatus that can be placed or mounted to a dry-cleaning bar used to hang clothing. Each slot 905 is configured to hold one or more hangers 11. Each slot 905 includes a pair of opposing side panels 902 and a base 903 disposed therebetween. The side panels 902 slope down towards the base 903 between them to ensure any hanger placed in the slot 905 is guided onto the base 903.

Instead of a line-of-sight sensor, a pressure sensor 906 detects the presence of a hanger 11 (represented by a circle in FIG. 9) hanging from slot 905. The signals received by the controller unit from a slot 905 have an equivalence to the beam-break embodiments previously described: no pressure corresponds to no beam break, detected pressure corresponds to beam broken. In addition, each individual slot has LEDs 904, and the dry-cleaning module can have an attract light.

A variation to each of the aforementioned embodiments (as described in FIGS. 1-9) is to use beam-break detection to indicate activity in a certain area (e.g., in a package room), rather than to indicate specific presence-or-absence of an item. For example, the signals of beam-break sensors of such embodiments communicate information more broadly, such as "your package was delivered to this area," rather than specifically "your package is located in this slot." Such embodiments may or may not confirm package pickup, but still provide the service of guiding the user to a smaller area to locate the package faster.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. A reference to a particular embodiment within the specification do not necessarily all refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed:

1. A package management system for tracking a location of an item, the system comprising:
    one or more slots, each slot including a pair of opposing spaced-apart planar surfaces slidably or fixedly mounted on a base, the pair of planar surfaces having one or more transmitters each configured to generate and output an electromagnetic signal and one or more receivers, each receiver disposed in a path of the electromagnetic signal emitted by one of the one or more transmitters and each producing a signal indicative of whether that receiver senses the electromagnetic signal emitted by that one of the one or more transmitters, wherein the opposing spaced-apart planar surfaces are part of any mechanical setup used for storage of items;
    a control unit including at least one processor in communication with the one or more receivers of each slot, the at least one processor being configured to determine from the signal produced by each receiver of a given slot whether that receiver senses the electromagnetic signal, the at least one processor being configured to consider the given slot to be empty if the signal produced by each receiver of the given slot indicates that each such receiver senses the electromagnetic signal and to consider the item to be present in the given slot if the signal produced by each receiver of the given slot indicates that a strength of the electromagnetic signal is below a predetermined threshold by at least one of the one or more receivers; and
    a data-acquisition device configured to acquire information associated with an item to be placed in the given slot, and the at least one processor is in communication with the data-acquisition device to receive the acquired information associated with the item, wherein the at least one processor is further configured to register the location as being at the given slot where the control unit tracks the item as being provided to if, in response to receiving the acquired information associated with the item and after the item is placed in the given slot, the at least one processor detects a reduction in the strength of the electromagnetic signal between the transmitter and receiver of the given slot so that the control unit can track the given slot registered as holding the item and distinguish the given slot from other slots tracked as being empty.

2. The package management system of claim 1, wherein at least one of the opposing planar surfaces has one or more mirrors positioned thereon to reflect the electromagnetic signal by a given one of the one or more transmitters towards a given one of the one or more receivers along a path that traverses a gap between the opposing planar surfaces at least twice.

3. The package management system of claim 1, further comprising a light source associated with the given slot, and the at least one processor is further configured to illuminate the light source only after the item location is registered and the item is placed in the given slot, wherein, in response to receiving the acquired information associated with the item, the light source is activated to visually guide a user to the given slot.

4. The package management system of claim 1, further comprising a light source associated with the given slot, and the at least one processor is further configured to illuminate the light source in response to the at least one processor detecting a change in state of the strength of the electromagnetic signal between the one or more transmitters and the one or more receivers of that given slot.

5. The package management system of claim 1, further comprising a pressure sensor operably coupled to a base surface of the given slot to measure weight of the item including a plurality of envelopes placed on the base surface.

6. The package management system of claim 5, wherein the at least one processor is configured to register the item as being located in the given slot if pressure sensor measures an increase in weight in the given slot.

7. The package management system of claim 5, wherein the at least one processor is configured to determine the item has been properly removed from the given slot if, in connection with receiving the acquired information associated with the item, the item is expected to be removed from the one or more slots and the at least one processor detects an increase in the strength of the electromagnetic signal between the one or more transmitters and the one or more receivers of the given slot and if the pressure sensor measures a decrease in weight in the given slot.

8. The package management system of claim 1, wherein the one or more transmitters and the one or more receivers include radio frequency (RF) elements, and that the signal strength is an RF signal strength compared to the threshold to establish a presence or absence of an item in the one or more slots.

9. The package management system of claim 1, wherein the one or more transmitters and the one or more receivers include optical elements, and that the signal strength is a light signal strength compared to the threshold to establish a presence or absence of an item in the one or more slots.

10. A method for tracking a location of an envelope, the method comprising:
generating a source of electromagnetic energy from an emitter disposed in a first wall of a slot designated for receiving an envelope of envelope-like item;
aligning a sensor disposed in a second wall of the slot with the electromagnetic energy from the emitter disposed in the first wall;
producing, by the sensor, a signal indicative of whether the sensor senses the electromagnetic energy; and
considering the slot to be empty if the electromagnetic energy indicates the sensor senses the strength of the electromagnetic energy; and
registering a location of the envelope as being in the slot where a control unit tracks the envelope as being provided to after the envelope is placed in the slot and the at least one processor detects a reduction in the strength of the electromagnetic signal between the transmitter and receiver of the slot so that the slot registered as holding the item and the slot can be distinguished from other slots tracked as being empty.

11. The method of claim 10, further comprising the step of acquiring information associated with the envelope, and wherein the step of registering the envelope as being located in the slot occurs if, in response to receiving the acquired information associated with the envelope, the envelope is expected to be placed in the slot and reduction in the strength of the electromagnetic signal is detected between the transmitter and receiver of the slot.

12. The method of claim 11, further comprising the step of confirming proper removal of the envelope from the given slot if, in response to receiving the acquired information associated with the envelope, the envelope is expected to be removed from the slot and the envelope was previously registered as being located in the slot.

13. The method of claim 11, further comprising illuminating a light source associated with the slot only after the envelope location is registered and the envelope is placed in the given slot, wherein, in response to receiving the acquired information associated with the envelope, the light source is activated to guide a user to the slot.

14. The method of claim 11, further comprising illuminating a light source associated with the slot light source in response to detecting a reduction in the strength of the electromagnetic signal between the transmitter and receiver of the slot.

15. The method of claim 10, further comprising measuring weight of envelopes placed on a base surface of the slot.

16. The method of claim 15, further comprising the step of acquiring information associated with the envelope, and wherein the step of registering the envelope as being located in the slot occurs if, in response to receiving the acquired information associated with the envelope, the envelope is expected to be placed in the slot, the reduction in the strength of the electromagnetic signal is detected between the transmitter and receiver of the slot, and an increase in weight is measured in the slot.

17. The method of claim 16, further comprising the steps of:
acquiring information associated with the envelope; and
determining the envelope has been properly removed from the slot if, in connection with receiving the acquired information associated with the envelope, the envelope is expected to be removed from the slot, a resumption of the light beam between the transmitter and receiver of the slot is detected, and a decrease in weight in the slot is measured.

18. The method of claim 10, wherein the source of electromagnetic energy includes RF signals and the sensor includes radio frequency (RF) elements that determine an RF signal strength of the RF signals to establish a presence or absence of an item in the slot.

19. The method of claim 10, wherein the sensor includes optical elements, and that the signal strength is a light signal strength compared to the threshold to establish a presence or absence of an item in the slot.

* * * * *